April 25, 1967 J. F. MALLOY ETAL 3,315,927
CORROSIONLESS PIPE SLIDE SUPPORT
Filed June 27, 1966

INVENTORS
JOHN F. MALLOY
WILLIAM C. TURNER
BY

ATTORNEY

United States Patent Office 3,315,927
Patented Apr. 25, 1967

3,315,927
CORROSIONLESS PIPE SLIDE SUPPORT
John F. Malloy, Charleston, and William C. Turner, South Charleston, W. Va., assignors to Union Carbide Corporation, a corporation of New York
Filed June 27, 1966, Ser. No. 560,772
2 Claims. (Cl. 248—55)

This is a continuation-in-part of application Ser. No. 466,319, filed June 23, 1965 which in turn is a continuation-in-part of application Ser. No. 292,551, filed July 3, 1963, now abandoned. The present invention relates to a novel corrosionless slideably movable structural support and more particularly to a pipe slide support which is easily installed and fabricated from materials which are corrosion-resistant, self-supporting, self-lubricating and relatively slideable with respect to movability of the support elements to provide for normal pipe movements such as thermal and pressure expansions and the like.

Corrosion due to electrolytic action, chemical attack, air, steam, and myriad other reasons at points of support in conduit and pipe systems in industrial installations is a longstanding, troublesome, and expensive problem in industry. Conduits, especially pipes carrying fluids, may move both laterally and axially by expansion and contraction from water hammer, by system pumping pulsations, by thermal expansion and in many instances by vibration. The abrasive action caused by continual relative movements between pipes, conduits and such and their support points, eventually cuts away whatever protective coatings such as bitumastic paints and the like surround these pipes and conduits and corrosion begins due to one or more of the aforementioned reasons. This destructive corrosion causes hazards to property and personnel and constitutes a continuing expense to industry through continued required surveillance and maintenance.

In efforts to mitigate the corrosion problem on conduits and pipe installations, researchers and engineers have tried, with no complete success prior to the time of the present invention, many methods of alleviating friction between support points and the borne loads of pipes, conduits and the like. The welding of a wear plate of metal to a conduit has been found to provide some relief from the occurrence of corrosion but in due time this extra thickness of metal provided by the wear plate itself corrodes. Roller type supports are known to operate effectively until corrosion on the roller journals causes rollers to freeze in their bearings and corrosion then begins between the non-rolling rollers and the support pipe or conduit. Powdered lubricants have also been tried to overcome the before-mentioned problems. However, under load, these powdered materials soon wore thin and metal-to-metal contact between the parts separated by the lubricant was again experienced along with the attendant corrosion problem.

In consideration of these ubiquitous corrosion problems found throughout industry, the present invention was conceived on the rationale that the corrosion problem can be solved by the use of self-support, self-lubricating materials which are unaffected by collections of moisture and other corrosive agents at the points of support of a structure or conduit while leaving the structure or conduit free to move relative to its support point.

It is therefore a primary object of this invention to provide for relative motion between a supported object such as a conduit and its structural support either in any direction or in a controlled direction by means of a support structure comprising self-supporting materials of satisfactory corrosion resistance and lubricity.

It is a further object of this invention to provide a corrosionless pipe and conduit support system which is easily and economically made and installed without requiring any extraordinary worker skills.

With the foregoing and other objects in view, the invention will now be described in greater particularity and with reference to the drawings wherein.

Figure 1:
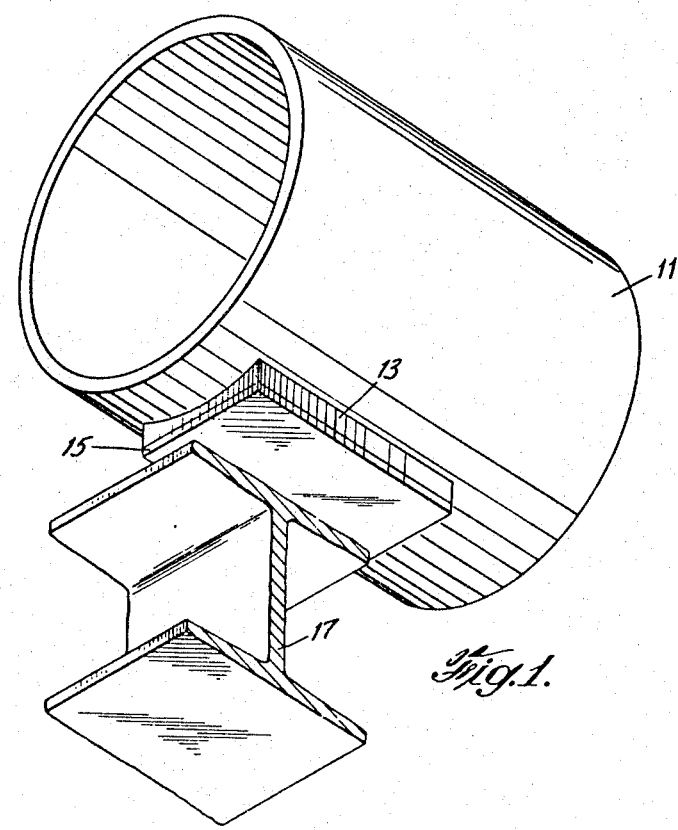
FIG. 1 is an isometric view illustrating pipe support apparatus according to the present invention in place between the supported pipe or conduit and a structural support member.

Referring to FIG. 1 of the drawings, there is shown a section of pipe 11 resting upon and in contiguous contact with a first plate member 13 of a pipe support assembly. First plate member 13 rests slideably upon a second plate member 15 of the pipe support assembly. The second plate member 15 is disposed in contiguous surface-to-surface contact with a structural support member 17, which for the purposes of illustration here is shown as a conventionally rolled section structural I beam. The pipe 11 and the first plate member 13 may be held together adhesively by any suitable adhesive material. In this respect epoxy resin adhesive materials have been found in practice to furnish very satisfactory results. Similarly, second plate member 15 and support member 17 may be adhesively connected by similar means. Alternatively, the respective contiguous contacts between pipe 11 and first plate member 13 and second plate member 15 and support member 17 may be without adhesive material between the respective parts provided that the property co-efficient of friction between these respective materials is properly selected for the desired application and design result.

Figure 2:
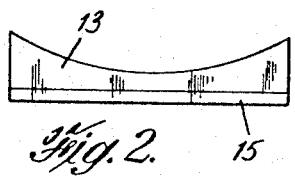
FIG. 2 is a sectional view through a pipe support apparatus of the invention.

FIG. 2 of the drawing shows the two-element pipe support apparatus itself in a sectional or end-on view. First plate 13 is provided with an arcuate depression at its pipe contacting surface, formed to accommodate the outside diameter of the particular pipe, conduit or whatever is to be supported. The structural support contacting surface of the second plate 15 is generally a flat surface but may be varied in configuration to suit particular requirements. The sliding action to provide for free pipe movement takes place, of course, at the intersurface defined between the two plate members 13, 15.

As the result of extensive research and development, including several test installations, it has been discovered that when both the first and second plate members of the pipe slide support apparatus of the invention are made of carbon a self-supporting, self-lubricating pipe slide support apparatus is achieved which is also characterized by being highly resistant to chemical corrosion and mechanical erosion.

Carbon is a known material of construction which is readily available in nature and can also be produced synthetically. In its highly amorphous state it is often called non-graphitic carbon. When non-graphitic carbon is heated to a temperature of the order of 2000–3000° C. it is said to be converted to graphite. Graphite simply is a highly crystallized form of carbon which is less dense and crystalline than diamond. As used herein and in the appended claims, the term "carbon" is meant to include both the non-graphitic and graphitic forms of carbon. However, the present definition of "carbon" does not include diamond.

Figure 3:
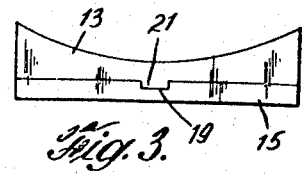
FIG. 3 is a sectional or end view of an alternative embodiment of pipe support apparatus according to the present invention illustrating a movement-restricting key feature.

FIG. 3 of the drawings shows an alternative embodiment of the apparatus according to the present invention wherein a lower plate 15 is provided with a milled or otherwise formed recess or depression 19 and the underside or first surface of the first plate 13 is provided with a surface projection or rib 21 extending longitudinally in the direction of the supported pipe or conduit and fitted in registerable relationship with recess 19. The embodiment of FIG. 3 of the drawings is designed to restrict pipe expansion and contraction (or whatever movement) to a locus axially parallel to the pipe longitudinal centerline. In considering the FIG. 3 embodiment persons skilled in the art will undoubtedly readily appreciate that the recess or rib feature can be disposed or oriented 90° from the position shown in the drawings and such apparatus used to restrict pipe movement to a lateral locus in respect to the pipe longitudinal centerline. Such installations may be desirable for instance where movement occurs on a short pipe section between two 90° bends.

The foregoing disclosure is posed for illustrative purposes only and there is intended here no unwarranted restrictions or limitations on the apparatus of this invention, it being considered that in the light of this disclosure numerous alternative embodiments within the spirit of this invention will suggest themselves to persons familiar with the art. The intended limitations therefore are those stated in the appended claims.

What is claimed is:

1. A self-supporting, self-lubricating slideable pipe support comprising, in combination, a first plate member and a second plate member, a first flat surface of said first plate member arranged for slideable contact with a first flat surface of said second plate member, a second arcuately depressed surface of said first plate member adapted to be in contiguous contact with a supported pipe, and a second surface of said second plate member adapted to be in contiguous contact with a structural means adapted to bear a load imposed thereon by a supported pipe and said slideable support, said first and second plate members consisting essentially of carbon.

2. An apparatus according to claim 1 wherein said second surface of said first plate member and said second surface of said second plate member are each respectively fixedly attached to said supported pipe and to said structural means adapted to bear a load imposed thereon by said supported pipe.

References Cited by the Examiner

UNITED STATES PATENTS

| | | | |
|---|---|---|---|
| 621,469 | 3/1899 | Dutton | 14—16 X |
| 2,151,321 | 3/1939 | Glover | 248—55 |
| 2,233,206 | 2/1941 | Frederick | 252—12.2 X |
| 2,322,771 | 6/1943 | Palm et al. | 252—12.2 X |
| 2,680,259 | 6/1954 | Milk | 14—16 |
| 2,849,414 | 8/1958 | Stott | 252—12 |
| 2,970,869 | 2/1961 | Thomas | 308—238 |
| 3,105,252 | 10/1963 | Milk | 14—16 |

FOREIGN PATENTS

| | | |
|---|---|---|
| 672,530 | 10/1963 | Canada. |
| 275,648 | 5/1928 | Great Britain. |
| 698,611 | 10/1953 | Great Britain. |
| 714,946 | 9/1954 | Great Britain. |

CLAUDE A. LEROY, *Primary Examiner.*